Figure 2:
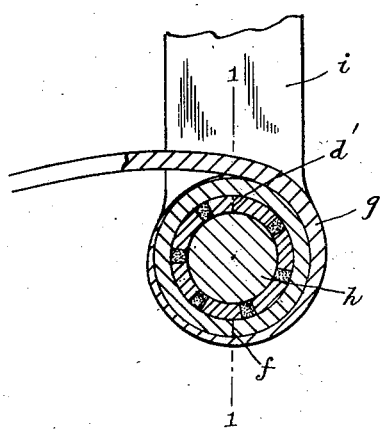

C. E. CLEMENS.
BUSHING.
APPLICATION FILED MAY 5, 1913.

1,113,754.

Patented Oct. 13, 1914.

WITNESSES:
R. L. Bruck
Brennan B. West

INVENTOR.
Chester E. Clemens
BY Hull & Smith
ATTYS.

UNITED STATES PATENT OFFICE.

CHESTER E. CLEMENS, OF CLEVELAND, OHIO.

BUSHING.

1,113,754.

Specification of Letters Patent.

Patented Oct. 13, 1914.

Application filed May 5, 1913. Serial No. 765,523.

*To all whom it may concern:*

Be it known that I, CHESTER E. CLEMENS, a citizen of the United States, residing at Cleveland, in the county of Cuyahoga and State of Ohio, have invented a certain new and useful Improvement in Bushings, of which the following is a full, clear, and exact description, reference being had to the accompanying drawings.

This invention relates to bushings, and more particularly to bushings of the self-lubricating type.

The object of this invention is generally to provide a bushing of this character which is not only extremely efficient, but which can be produced at a comparatively small expense.

Self-lubricating bushings, as most ordinarily constructed, consist of a cast metal cylindrical body having grooves on the interior thereof. These bushings are not only expensive as compared with those which it is the object of this invention to produce, but are limited, through foundry practice, as to the angular inclination of the grooves. By the construction disclosed herein, I am enabled to produce a bushing which is not only efficient in operation and cheap of production but in which any angular inclination may be given to the slots or grooves in the interior of the bushing.

Figure 1:
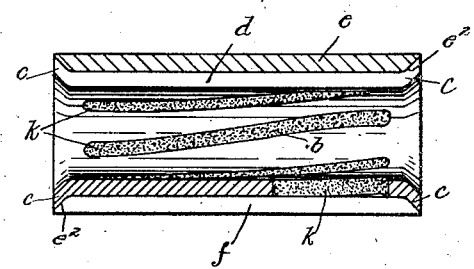
Figure 3:
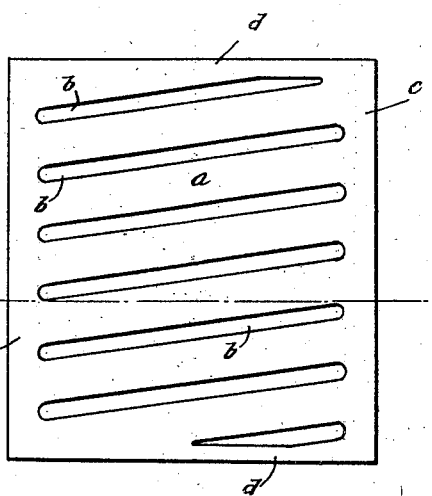

Generally speaking the invention may be defined as consisting of the combinations of elements embodied in the claims annexed hereto and illustrated in the drawings forming part hereof wherein:

Figure 1 represents a longitudinal sectional view taken through a bushing constructed in accordance with my invention, the section being taken on the line 1—1 of Fig. 2; Fig. 2 is a transverse, sectional view taken through such bushing and the eye of a spring to which the bushing may be applied; Fig. 3 is a plan view of the slotted blank from which the inner member of the bushing is formed.

Describing by reference characters the various parts illustrated herein, $a$ denotes a sheet metal blank from which the inner member of the bushing is formed. This blank is rectangular in shape and is provided within the edges thereof with parallel inclined slots $b$. These slots terminate short of the sides and ends of the blank, leaving a lateral imperforate margin $c$ at each end of the blank and a similar imperforate margin $d$ at the top and bottom of the blank.

The slotted apertures $b$ extend entirely through the blank $a$ and may be conveniently and cheaply formed by punching. The blank is then rolled into tubular form and forced into a sleeve $e$, constituting the outer member of the bushing. This sleeve may be a piece of tubing, or it may be formed by rolling a piece of metal into tubular form with the ends abutting, as indicated at $f$ in Fig. 2. In such case, care will be taken that the joint at $f$ is angularly spaced from the joint $d'$ formed between the lateral edges $d$ of the inner or lining member of the bushing.

As will appear more particularly from Fig. 1, the ends of the reinforcing or outer member $e$ are preferably outwardly beveled, as shown at $e^2$, and the ends $c$ of the inner or lining member are spun outwardly into engagement with these inclines thereby locking the lining member of the bushing securely in place. When the inner or lining member of the bushing is inserted in place, the slotted apertures $b$ may be filled with graphite or other lubricant, indicated at $k$.

In Fig. 2 the bushing is shown as applied to an eye $g$ of a spring, the bushing extending through said eye and receiving therewithin the spring bolt $h$. This bolt may be suspended from shackles, one of which is indicated at $i$. While the bushing is shown as applied to a spring, this is only one of numerous uses to which it may be applied.

By the construction described herein, it will be apparent that I have produced a metal bushing of the self-lubricating type which is extremely simple of construction and efficient in operation. The slots $b$ are preferably so inclined as to make any angle not in excess of ten degrees with respect to the edges $d$, as such angle has been found to be best suited for preserving the lining against crushing by the inclosed pin as well as insuring the spreading of the lubricant over the spaces between the slots. This action will be apparent from an inspection of Fig. 3, wherein the line A—A indicates the pressure line of the pin against the liner or inner member of the bushing. It will be apparent from this illustration that the pressure line may extend across the entire length of the bushing between two of the slots without intersecting either of them and that it will never simultaneously intersect the ends of two slots adjacent to the edges c, thereby to subject the short edge portions simultaneously to the crushing pressure of the pin. A solid metallic bearing for the pin is thus provided which is sufficiently strong to resist the crushing action thereof. Furthermore, the ends of the slots terminate a sufficient distance from the edges c to permit these edges to be flared outwardly, as shown in Fig. 2, and at the same time to bring the ends well within the flared portions, whereby a sufficient body of metal is provided beyond these ends to withstand the crushing action of the pin.

While my bushing is advantageous in other relations, it is especially adapted for use where a rocking or reciprocatory rotary movement is imparted to the internal pin, bolt or shaft. By its use ample lubrication is afforded for the pin, bolt or shaft, the lubricant being spread through the spaces between the slots and serving to lubricate these spaces sufficiently while, owing to the arrangement of the perforations or slots, the liner sleeve is fully capable of withstanding the crushing action to which it is subjected by the said pin, bolt or shaft.

Having thus described my invention, what I claim is:

1. A bushing comprising an inner tubular member having apertures extending therethrough and an outer reinforcing member surrounding the inner member and closing the outer ends of said apertures, said apertures being arranged in lines which are inclined to the axis of the inner member, the inclination of the lines being such with reference to the length of the inner member that the axial pressure line exerted against the inner member will intersect but one line at any time.

2. A bushing comprising an inner tubular member having inclined slots extending therethrough and an outer reinforcing member surrounding the inner member and closing the outer ends of the slots, the inclination of the slots to the axis of the said inner member and the length of the slots being such that the axial pressure line within the interior of the inner member will intersect but one slot at any time.

3. A bushing comprising an inner tubular member having inclined slots extending therethrough and an outer reinforcing member surrounding the inner member and closing the outer ends of the slots, the inclination of the said slots to the axis of the inner member and the length of the slots relative to the length of the inner member being such that the axial pressure line within the inner member will intersect but one of the slots at any time, the ends of the inner member being extended beyond the slots providing elongated surfaces therebeyond against which axial pressure can be exerted without collapsing the inner member.

In testimony whereof, I hereunto affix my signature in the presence of two witnesses.

CHESTER E. CLEMENS.

Witnesses:
JOHN B. HULL,
ALBERT H. BATES.